(12) United States Patent
Noguchi et al.

(10) Patent No.: US 11,797,239 B2
(45) Date of Patent: Oct. 24, 2023

(54) PRINT CONTROLLER AND NON-TRANSITORY COMPUTER READABLE MEDIUM

(71) Applicant: FUJIFILM Business Innovation Corp., Tokyo (JP)

(72) Inventors: Daisuke Noguchi, Kanagawa (JP); Takashi Kikumoto, Kanagawa (JP); Shingo Tajima, Kanagawa (JP); Megumi Yamaguchi, Kanagawa (JP); Yoshihiro Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 177 days.

(21) Appl. No.: 16/435,576

(22) Filed: Jun. 10, 2019

(65) Prior Publication Data

US 2019/0384540 A1    Dec. 19, 2019

(30) Foreign Application Priority Data

Jun. 18, 2018    (JP) ................ 2018-115386

(51) Int. Cl.
*G06F 3/13*    (2006.01)
*G06F 3/12*    (2006.01)

(52) U.S. Cl.
CPC ............ *G06F 3/1205* (2013.01); *G06F 3/125* (2013.01); *G06F 3/1257* (2013.01)

(58) Field of Classification Search
CPC ...... G06F 3/1205; G06F 3/125; G06F 3/1257; G06F 3/1252; G06F 3/1204; G06F 3/1288

See application file for complete search history.

(56) References Cited

U.S. PATENT DOCUMENTS 5,731,879 A * 3/1998 Maniwa ............. H04N 1/00572
                                                          358/401
6,006,012 A * 12/1999 Shimizu ................. G06K 15/02
                                                          355/23

(Continued)

FOREIGN PATENT DOCUMENTS

JP    H05270009    10/1993
JP    6-167910    * 6/1994

(Continued)

OTHER PUBLICATIONS

"Office Action of Japan Counterpart Application" with English translation thereof, dated Apr. 5, 2022, p. 1-p. 6.

*Primary Examiner* — Huo Long Chen
(74) *Attorney, Agent, or Firm* — JCIPRNET

(57) ABSTRACT

A print controller includes a first print command unit, an output command unit, and a second print command unit. The first print command unit prints multiple page images onto multiple printing media in either one of a first sequence, in which the page images are printed starting from a leading page image toward a final page image, and a second sequence, in which the page images are printed starting from the final page image toward the leading page image. The output command unit gives a command for outputting the printing media to an output destination of a printing apparatus in a state where a printed face of each printing medium faces upward. The second print command unit gives a command for further printing the page images onto the printing media, which are fed to a feed destination of the printing apparatus while being kept in the upward-facing output state in the output destination, such that the printing is performed in the other one of the first sequence and the second sequence.

11 Claims, 13 Drawing Sheets

(56) References Cited

U.S. PATENT DOCUMENTS

| | | | | |
|---|---|---|---|---|
| 2002/0052897 A1* | 5/2002 | Nishikawa | ............ | G06F 3/1204 715/201 |
| 2002/0116439 A1* | 8/2002 | Someshwar | .......... | G06F 3/1205 358/1.15 |
| 2003/0164971 A1* | 9/2003 | Kidani | .................... | H04N 1/46 358/1.13 |
| 2005/0097866 A1* | 5/2005 | Hudetz | ................. | B41J 13/103 53/474 |
| 2008/0152375 A1* | 6/2008 | Kadota | ................. | G03G 15/50 399/81 |
| 2010/0044949 A1* | 2/2010 | Nakamura | ............ | B65H 43/06 271/3.17 |
| 2010/0110482 A1* | 5/2010 | Honda | ................. | G06F 3/1285 358/1.18 |
| 2011/0211888 A1* | 9/2011 | Fujinaga | .............. | B41J 13/0009 399/403 |
| 2013/0135630 A1* | 5/2013 | Miyajima | ............... | B41L 39/16 358/1.6 |
| 2015/0286446 A1* | 10/2015 | Nuggehalli | ........... | G06F 3/1259 358/1.15 |
| 2019/0384540 A1* | 12/2019 | Noguchi | ............... | G06F 3/1204 |

FOREIGN PATENT DOCUMENTS

| | | | |
|---|---|---|---|
| JP | 2012-108827 | | 6/2012 |
| JP | 2018026758 | | 2/2018 |
| JP | 2018026758 A | * | 2/2018 |

* cited by examiner

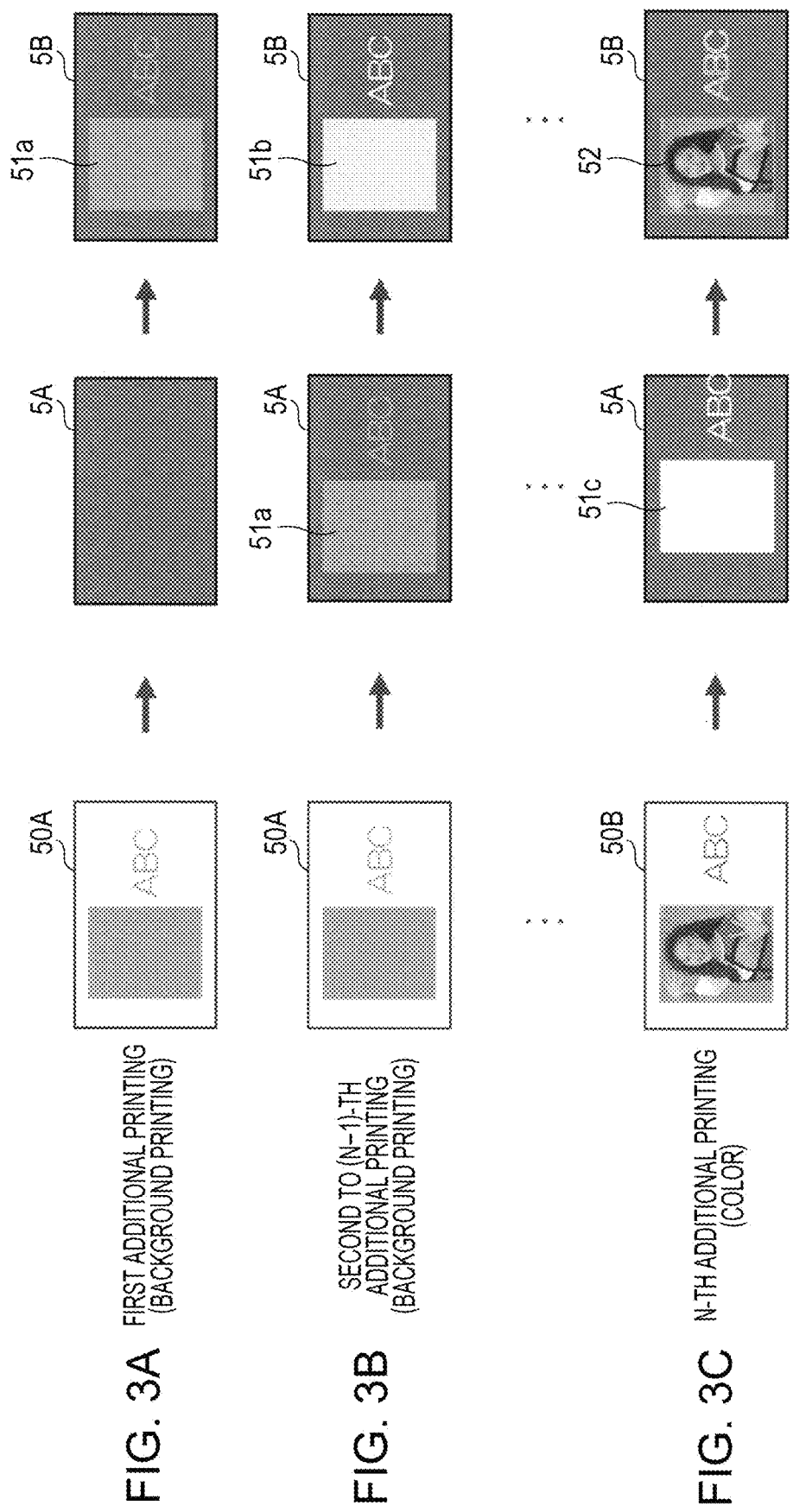

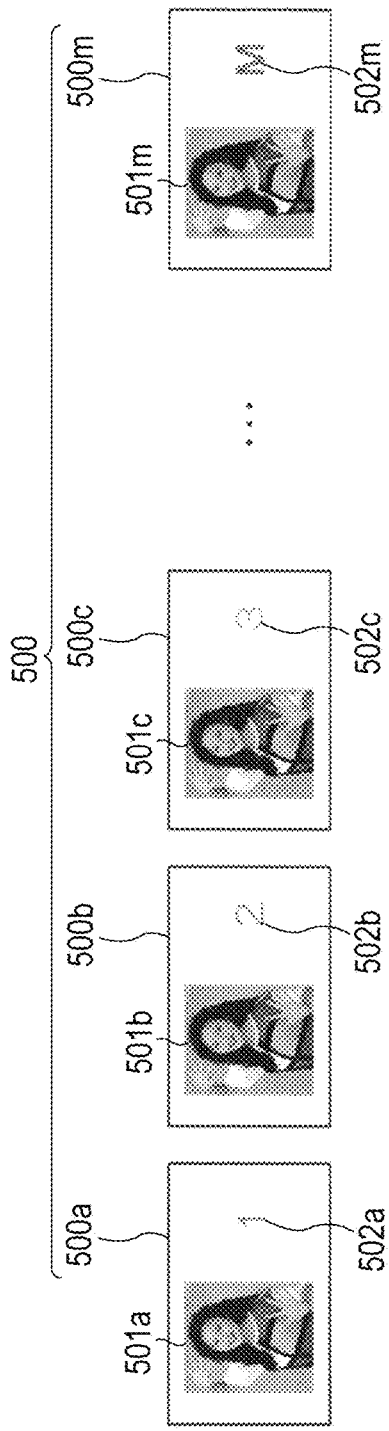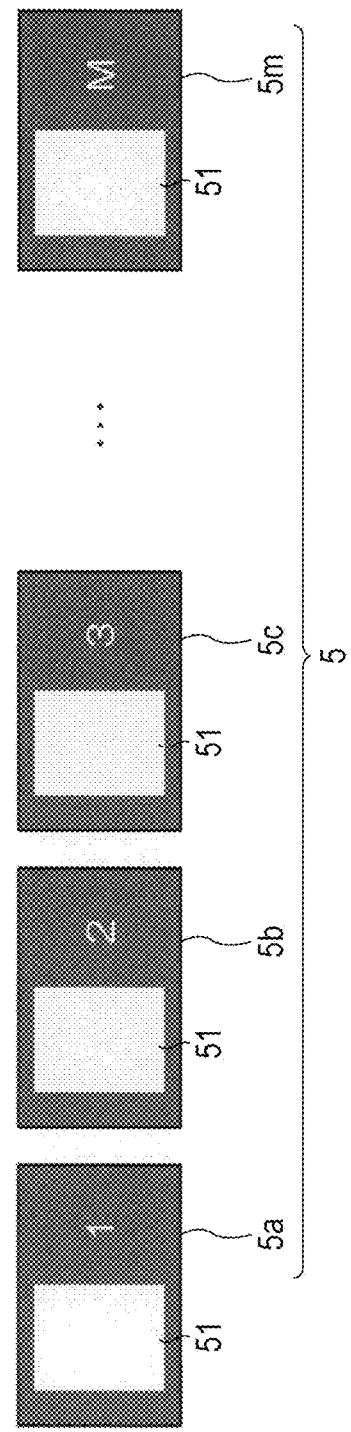

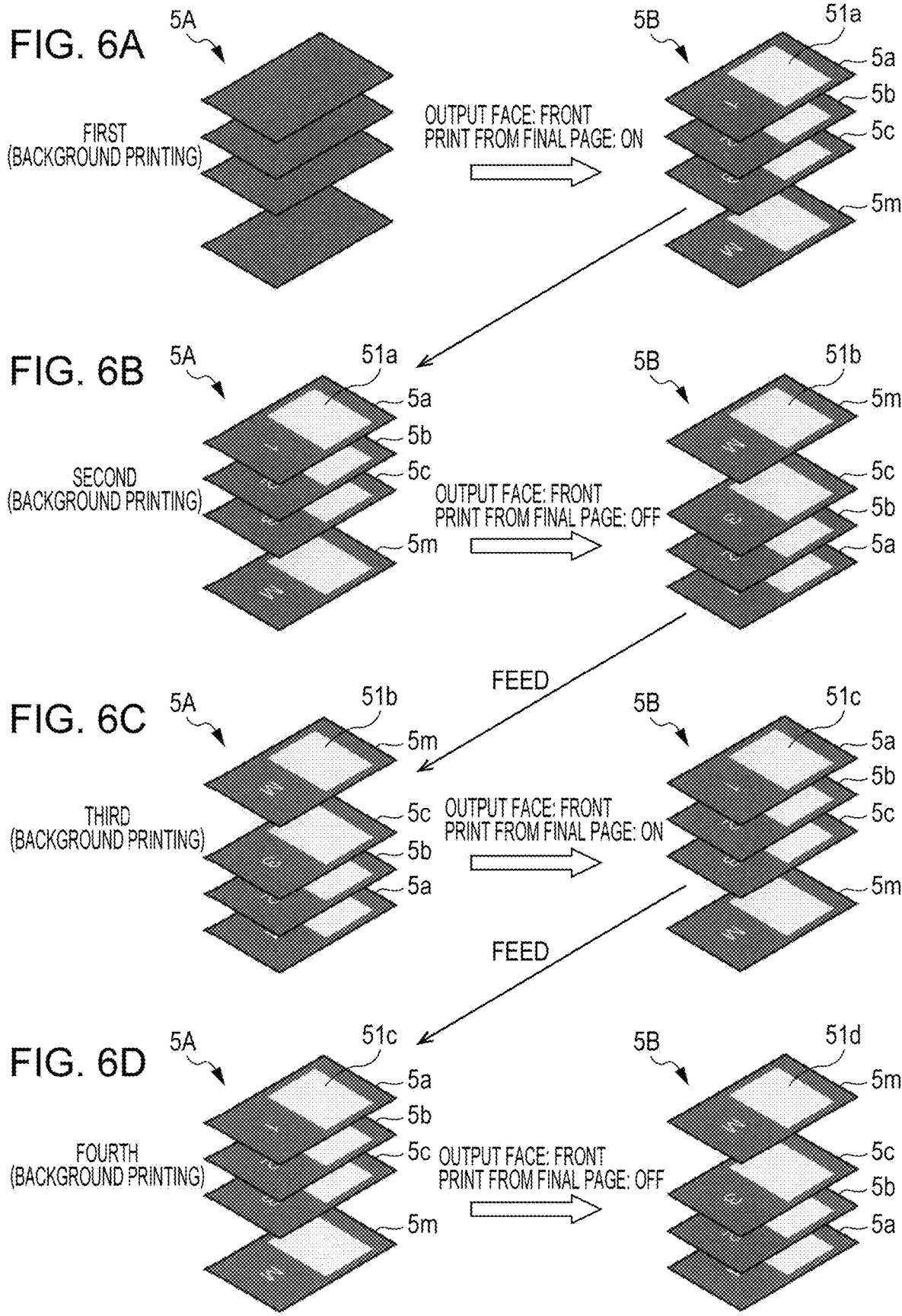

PRINT CONTROLLER AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-115386 filed Jun. 18, 2018.

BACKGROUND (i) Technical Field

The present disclosure relates to print controllers and non-transitory computer readable media.

(ii) Related Art

Japanese Unexamined Patent Application Publication No. 2012-108827 proposes an example of a print controller that forms a proper image onto an additional-printing sheet without causing a print error.

The print controller described in Japanese Unexamined Patent Application Publication No. 2012-108827 includes an image forming unit that forms an image onto an additional-printing sheet, a reading unit that reads the image from the additional-printing sheet, a storage unit that stores read image data obtained as a result of the reading performed by the reading unit, and a communication unit that transmits the read image data.

SUMMARY

Aspects of non-limiting embodiments of the present disclosure relate to a print controller and a non-transitory computer readable medium that facilitates a user operation when a plurality of output printing media having a plurality of page images sequentially printed thereon are to be refed, as compared with a case where printing operation is performed without changing the printing sequence.

Aspects of certain non-limiting embodiments of the present disclosure address the above advantages and/or advantages not described above. However, aspects of the non-limiting embodiments are not required to address the advantages described above, and aspects of the non-limiting embodiments of the present disclosure may not address advantages described above.

According to an aspect of the present disclosure, there is provided a print controller including a first print command unit, an output command unit, and a second print command unit. The first print command unit prints a plurality of page images onto a plurality of printing media in either one of a first sequence, in which the plurality of page images are printed starting from a leading page image toward a final page image, and a second sequence, in which the plurality of page images are printed starting from the final page image toward the leading page image. The output command unit gives a command for outputting the plurality of printing media to an output destination of a printing apparatus in a state where a printed face of each printing medium faces upward. The second print command unit gives a command for further printing the plurality of page images onto the plurality of printing media, which are fed to a feed destination of the printing apparatus while being kept in the upward-facing output state in the output destination, such that the printing is performed in the other one of the first sequence and the second sequence.

BRIEF DESCRIPTION OF THE DRAWINGS

An exemplary embodiment of the present disclosure will be described in detail based on the following figures, wherein:

FIGS. 3A to 3C schematically illustrate an example of additional printing;

FIGS. 5A and 5B illustrate an example of background printing and a document used for describing the operation;

FIGS. 6A to 6D illustrate an example of background printing executed in a printer;

DETAILED DESCRIPTION

An exemplary embodiment of the present disclosure will be described below with reference to the drawings. Components having substantially identical functions will be given the same reference signs, and redundant descriptions thereof will be omitted.

General Outline of Exemplary Embodiment

A print controller according to an exemplary embodiment includes a first print command unit, an output command unit, and a second print command unit. The first print command unit prints a plurality of page images onto a plurality of printing media in either one of a first sequence, in which the plurality of page images are printed starting from a leading page image toward a final page image, and a second sequence, in which the plurality of page images are printed starting from the final page image toward the leading page image. The output command unit gives a command for outputting the plurality of printing media to an output destination of a printing apparatus in a state where a printed face of each printing medium faces upward. The second print command unit gives a command for further printing the plurality of page images onto the plurality of printing media, which are fed to a feed destination of the printing apparatus while being kept in the upward-facing output state in the output destination, such that the printing is performed in the other one of the first sequence and the second sequence.

The "output destination" corresponds to, for example, an output tray of the printing apparatus. The expression "output state in the output destination" refers to a state where the vertical and horizontal arrangement directions of the printing media when output onto the output tray, the directions of the front and rear faces thereof, and the sequence in which the media are stacked are not changed. The "feed destination" corresponds to a feed tray of the printing apparatus.

Exemplary Embodiment

Figure 1:
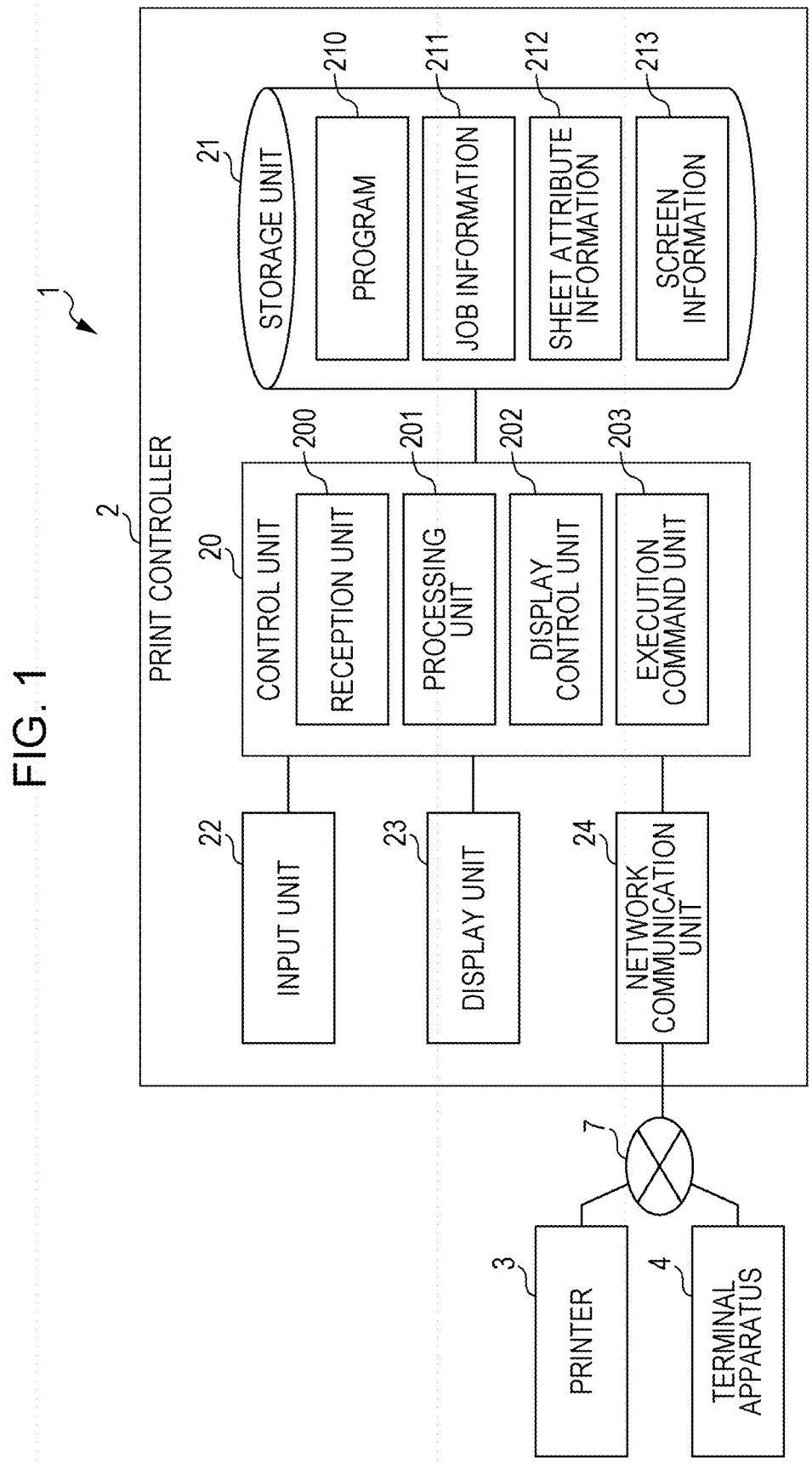
FIG. 1 is a block diagram illustrating an example of a configuration and a control system of a printing system according to an exemplary embodiment of the present disclosure.

FIG. 1 is a block diagram illustrating an example of a configuration and a control system of a printing system 1 according to an exemplary embodiment of the present disclosure. The printing system 1 includes a print controller 2, a printer 3 controlled by the print controller 2, and a terminal apparatus 4 that gives commands to the print controller 2 and the printer 3 in accordance with an operation performed by a user. The print controller 2, the printer 3, and the terminal apparatus 4 are connected to one another via a network 7.

The print controller 2 has, for example, a print server function, such as digital front end (DFE), for controlling the printer 3. The printer 3 is an example of a printing apparatus.

The terminal apparatus 4 used may be a portable information terminal, such as a personal computer, a tablet terminal, or a multifunction portable telephone (smartphone). The network 7 is, for example, a local area network (LAN), a wide area network (WAN), the Internet, or an intranet, and may be wired or wireless.

Configuration of Print Controller 2

The print controller 2 includes a control unit 20 that controls each unit, a storage unit 21 that stores various types of data, an input unit 22 realized by, for example, a keyboard and/or a mouse, a display unit 23 realized by, for example, a liquid crystal display, and a network communication unit 24 that performs communication between the printer 3 and the terminal apparatus 4 via the network 7.

The control unit 20 includes a central processing unit (CPU) and an interface. The CPU operates in accordance with a program 210 stored in the storage unit 21 so as to function as a reception unit 200, a processing unit 201, a display control unit 202, and an execution command unit 203. The execution command unit 203 is an example of a first print command unit, a second print command unit, and an output command unit. Detailed descriptions of the units 200 and 203 will be provided later.

Figure 2:
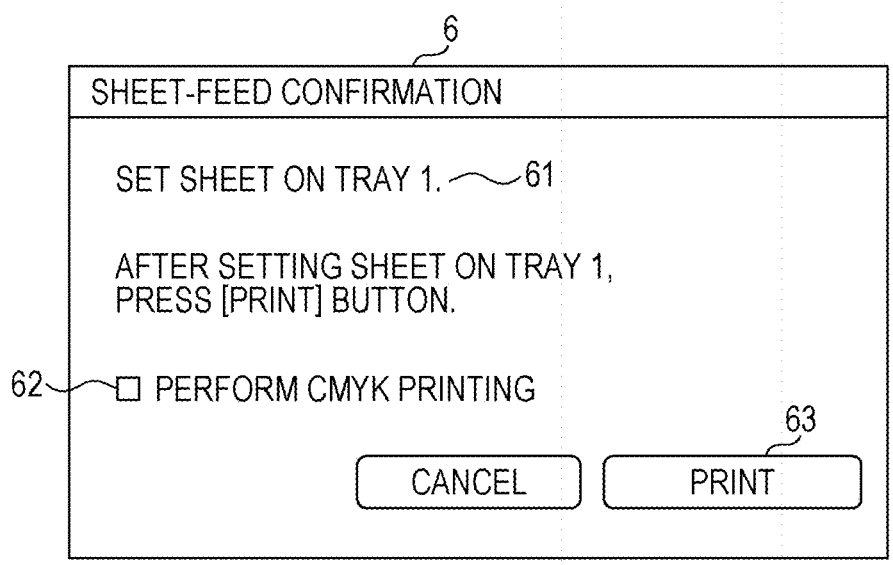
FIG. 2 illustrates an example of a sheet-feed confirmation dialog.

The storage unit 21 includes a read-only memory (ROM), a random access memory (RAM), and a hard disk, and stores various types of data, such as the program 210, job information 211, sheet attribute information 212, and screen information 213 (see FIG. 2).

The job information 211 is related to a print job, which will be described later. The sheet attribute information 212 indicates attributes, such as the material and the base color, of a sheet (referred to as "printing sheet" or "medium" hereinafter; see FIG. 3) that is to be used in a feed tray (not shown) of the printer 3 and that is to be fed for printing. The sheet attribute information 212 is stored in association with information for identifying the feed tray. A medium 5 is an example of a printing medium (i.e., a target onto which print data is to be recorded). In this description, the term "record" will be used when specific information is updated, and the term "store" will be used when information is written in the storage unit 21.

Next, the screen information 213 will be described with reference to FIG. 2. FIG. 2 illustrates an example of a sheet-feed confirmation dialog. A sheet-feed confirmation dialog 6 is an example of a sheet-feed confirmation screen used for confirming the user about sheet feeding. The sheet-feed confirmation dialog 6 is provided with, for example, a message 61 prompting the user to feed a sheet, a switch checkbox 62 used for giving a command for switching from a specific-color printing mode, which will be described later, to a multicolor printing mode using, for example, cyan (C), magenta (M), yellow (Y), and black (K) colors, and a print button 63 used for giving a command for resuming printing. The switch checkbox 62 is an example of a switch command unit.

The network communication unit 24 is realized by a network interface card (NIC) and exchanges a signal between the printer 3 and the terminal apparatus 4 via the network 7.

Next, the units 200 to 203 constituting the control unit 20 will be described. The reception unit 200 receives a print command (also referred to as "print job" hereinafter) transmitted from the terminal apparatus 4, as well as various types of information transmitted from the printer 3. The reception unit 200 also records the information related to the received print job in the job information 211 in the storage unit 21.

The print job includes data (also referred to as "print data" hereinafter) to be printed and described in units of pages by using, for example, a page description language (PDL), such as Portable Document Format (PDF) or PostScript (registered trademark) interpretable by the printer 3, and also includes various types of conditions (also referred to as "printing conditions" hereinafter) for executing printing.

The printing conditions include the type of medium 5, attribute information about the medium 5, such as the size thereof, a condition (also referred to as "first printing condition" hereinafter) related to a printing mode, such as monochromatic printing/color printing, simplex printing/duplex printing, or the number of print copies, and a condition (also referred to as "second printing condition" hereinafter) related to additional printing, such as information indicating an attribute about additional printing, which will be described later. The "first printing condition" is a collective term for a condition, excluding the second printing condition related to additional printing, from among printing conditions settable in the printing system 1.

The information indicating an attribute about additional printing includes, for example, information indicating whether or not additional printing is to be performed (also referred to as "additional-printing mode" hereinafter). An additional-printing mode is indicated by using an expression, such as "on" (i.e., a mode in which additional printing is performed) and "off" (i.e., a mode in which additional printing is not performed).

The processing unit 201 processes the print data contained in the print job received by the reception unit 200 so that printing may be executed in the printer 3. For example, the processing unit 201 performs processing for interpreting the PDL, that is, raster image processing (RIP) for converting print data described in the PDL into image data (also referred to as "raster image data" hereinafter) containing raster data.

Raster image data is related to a bitmap print image (also referred to as "print image" or "raster image") constituted of a group of dots (pixels). A raster image is generated in an output format, such as Joint Photographic Experts Group (JPEG), Tag Image File Format (TIFF), Graphics Interchange Format (GIF), or Portable Network Graphics (PNG).

Furthermore, a raster image includes a color version (e.g., a C version, an M version, a Y version, and a K version, which are also collectively referred to as "CMYK version") corresponding to recording materials (e.g., recording materials of four colors, namely, C, M, Y, and K colors) of chromatic colors (referred to as "colors" hereinafter) of the printer 3, a special version corresponding to a specific color (e.g., white or metallic color), and a tag version having identification information recorded therein for identifying an object, such as a text character or a pattern, contained in the print data. The colors are an example of a plurality of colors.

The display control unit 202 performs control so as to cause the display unit 23 to display various types of screens, such as the sheet-feed confirmation dialog 6 described above. The display control unit 202 may transmit, to the terminal apparatus 4, display command information for commanding the terminal apparatus 4 to display a screen, so as to cause a display (not shown) of the terminal apparatus 4 to display a screen.

The execution command unit 203 commands the designated printer 3 to execute printing in accordance with the print job received by the reception unit 200. Specifically, the execution command unit 203 sets execution command information for commanding execution of printing and uses the network communication unit 24 to transmit, to the designated printer 3, the execution command information via the network 7, thereby commanding the printer 3 to execute printing.

The execution command information contains, for example, the first printing condition, a raster image 50 generated by the processing unit 201, information indicating which one of the front face and the rear face (also simply referred to as "output face" hereinafter) of a medium 5 is to face upward when the medium 5 having undergone additional printing is to be output onto an output tray (not shown) of the printer 3, and information indicating whether or not printing is to be performed from the final page toward the leading page (also referred to as "print-from-final-page mode" hereinafter) in a case where a plurality of page images are to be printed. In a case of simplex printing, the front face is an example of a printed face, whereas the rear face is an example of a non-printed face.

In a case where a command for executing specific-color printing is given, the special version alone may be included as the raster image 50 in the execution command information. In a case where a command for the color printing mode is given, the CMYK version alone may be included as the raster image 50 in the execution command information.

Furthermore, the "print-from-final-page" mode is provided with selective information about, for example, "on" or "off" as the set value. Specifically, if the set value for the "print-from-final-page" mode is "on", a command for executing printing from the final page toward the leading page is given. If the set value for the "print-from-final-page" mode is "off", a command for executing printing from the leading page toward the final page is given.

The sequence in the "on" mode, that is, the sequence starting from the final page toward the leading page, is an example of a second sequence. The sequence in the "off" mode, that is, the sequence starting from the leading page toward the final page, is an example of a first sequence. The printing performed in the second sequence is also referred to as "N-to-1 printing", and the printing performed in the first sequence is also referred to as "1-to-N printing".

Additional Printing

Next, additional printing will be described with reference to FIGS. 3A to 4C. FIGS. 3A to 3C schematically illustrate an example of additional printing. Additional printing is color printing performed after specific-color printing is performed one or more times. For example, the specific color may be set in accordance with the base color of the medium 5. As shown in FIGS. 3A to 3C, for example, if the base color of the medium 5 is black, white (i.e., a single color) may be used as the specific color. For example, the medium 5 is formed of paper. Although the base color of the medium 5 shown in FIGS. 3A to 3C is black, only the edges of the medium 5 are shown in black for the sake of convenience. The same applies hereinafter.

In each of FIGS. 3A to 3C, the left column indicates an example of a raster image 50, the middle column indicates an example of a medium 5A to be fed, and the right column indicates an example of a medium 5B that has undergone printing and is to be output. As shown in FIGS. 3A and 3B, white printing (also referred to as "background printing" hereinafter) using only a white recording material corresponding to a special version 50A of the raster image 50 is performed from first printing to (N−1)-th printing. N indicates an integer of 2 or greater and may be set by, for example, the user. Background printing is an example of first printing.

The amount of white recording material used in a single background printing process is appropriately adjustable, and may be set to, for example, the maximum permissible amount in accordance with the printing system 1.

If N is 3 or greater, the medium 5A that is to undergo (N−K)-th printing is the medium 5B output after (N−K−1)-th printing, which is immediately previous to the (N−K)-th printing. K is a natural number. Accordingly, background printing using a white recording material alone is repeated (N−1) times.

Next, as shown in FIG. 3C, N-th color printing using CMYK recording materials corresponding to a CMYK version 50B is performed on the medium 5B that has undergone white printing (N−1) times using a white recording material and that is output after the (N−1)-th printing. Color printing is an example of second printing.

Accordingly, the tone of white color printed on the medium 5B output sequentially from the first printing to the (N−1)-th printing becomes stronger (see FIGS. 3A and 3B). Furthermore, as shown in FIG. 3C, in the N-th printing, a color is added to a white-printed region of the medium 5B output after the (N−1)-th printing.

Figure 4A:
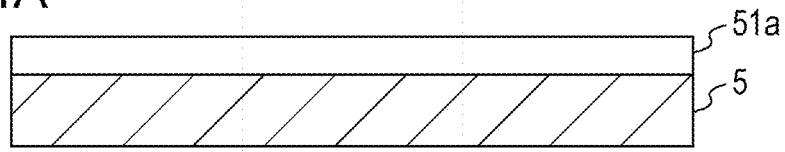
FIGS. 4A to 4C are cross sectional views schematically illustrating a medium that has undergone additional printing.
Figure 4B:
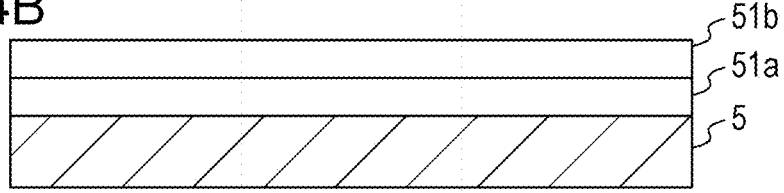
Figure 4C:
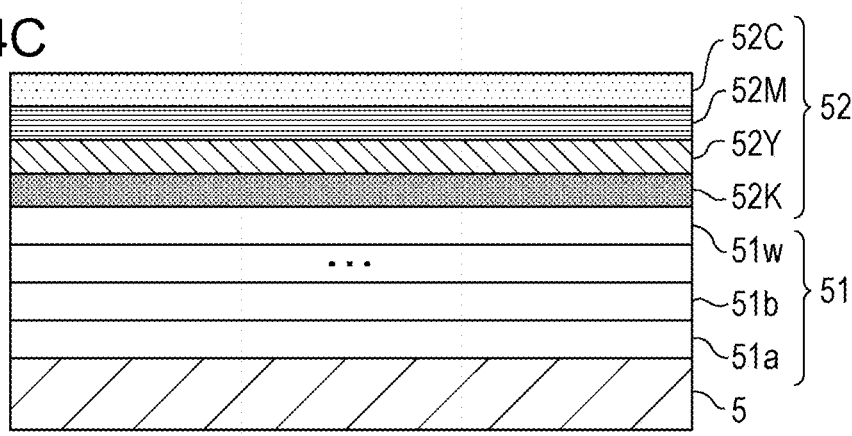

FIGS. 4A to 4C are cross sectional views schematically illustrating the medium 5 that has undergone additional printing. FIGS. 4A to 4C respectively correspond to the right columns of FIGS. 3A to 3C. The dimensional ratios of the thicknesses of recording-material layers 51a, 51b, 51w, and 52 shown in FIGS. 4A to 4C to the thickness of the medium 5 are not necessarily equal to the actual dimensional ratios. Although the recording-material layers 51a, 51b, 51w, and 52 are illustrated across the entire region of the medium 5 in the horizontal direction for the sake of convenience, the recording-material layers 51a, 51b, 51w, and 52 are actually stacked only in a printed region of the medium 5 (e.g., a position where text is printed or a position where a graphic pattern is printed).

As sequentially shown in FIGS. 4A to 4C, a first white-recording-material layer 51a, a second white-recording-material layer 51b, . . . , an (N−1)-th white-recording-material layer 51w (N being a natural number), and a CMYK recording-material layer 52 are sequentially stacked on the medium 5 in accordance with the number of times printing is performed. The sequence in which layers (a C layer 52C, an M layer 52M, a Y layer 52Y, and a K layer 52K)

constituting the CMYK recording-material layer 52 are stacked is not limited to the sequence shown in FIG. 4C.

Operation According to Exemplary Embodiment

Next, an example of operation performed by the printing system 1 will be described with reference to FIGS. 5A and 5B, 6A to 6D, 7, 8, and 9. FIGS. 5A and 5B illustrate an example of background printing and a document used for describing this operation. Each medium 5 has a black base. For the sake of convenience, only the edges of the medium 5 are shown in black, and the surface is shown in a color (grey) lighter than black.

As shown in FIG. 5A, a document 500 includes M page images 500a to 500m. M is a natural number. Reference signs 500b, 500c, and so on are given in that sequence from the leading page image 500a to the final page image 500m.

The page images 500a to 500m also include color photographs 501a to 501m and color text characters 502a to 502m, respectively. Although the photographs 501a to 501m used are identical among the page images 500a to 500m in this example, the photographs may be different from one another. In addition to text characters and photographs, the page images 500a to 500m may include graphic patterns and tables. Text characters include numeric characters.

As shown in FIG. 5B, a plurality of sheets of media 5a to 5m respectively undergo background printing using a white recording material in regions of the photographs 501a to 501m and regions of the text characters 502a to 502m in accordance with the special version 50A of the raster image 50 corresponding to the page images 500a to 500m of the document 500. The following description relates to an example where additional printing is performed N times, in which the N-th time involves performing color printing using CMYK recording materials, after background printing is repeatedly performed (N−1) times.

Figure 9:
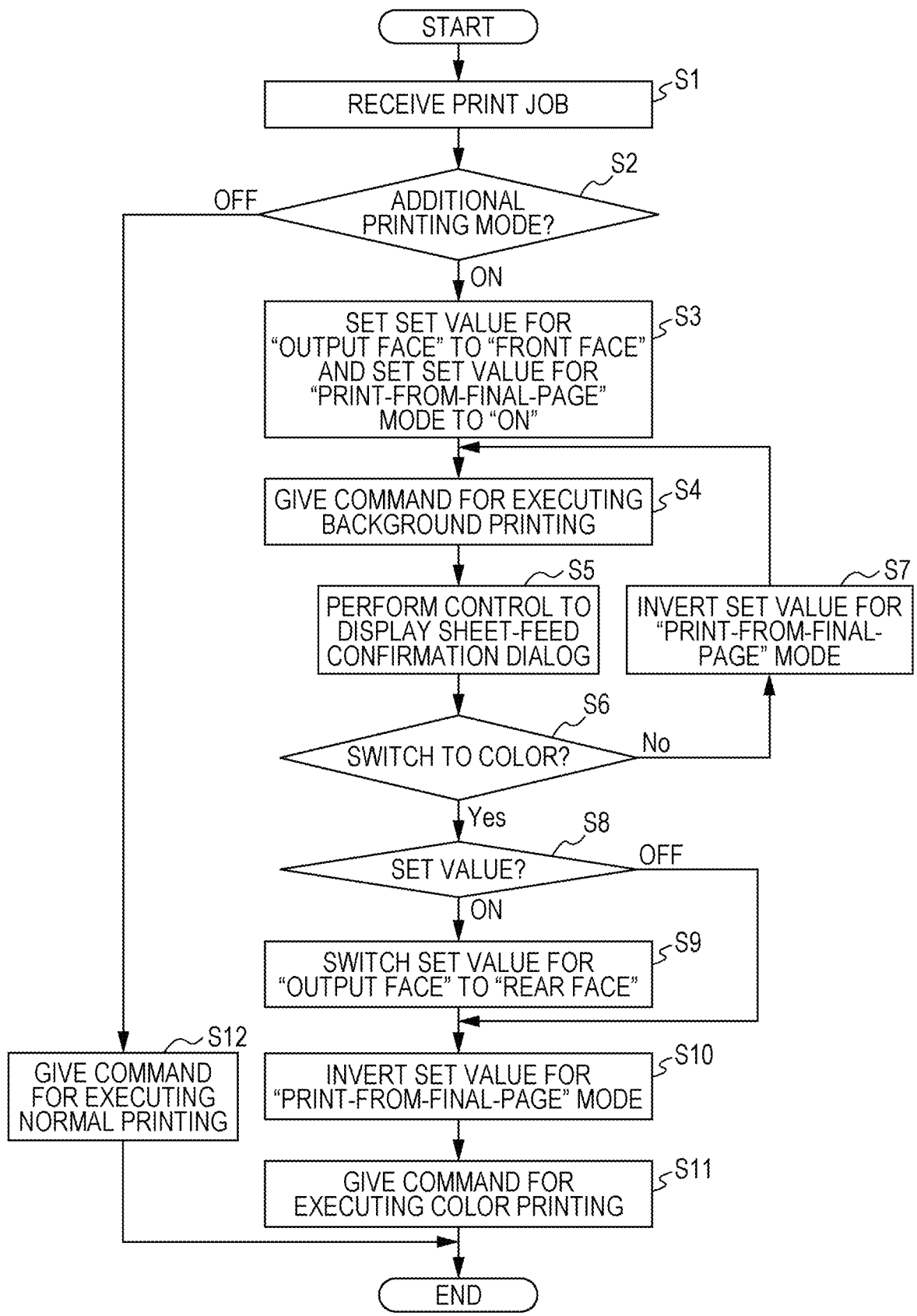
FIG. 9 is a flowchart illustrating an example of operation performed by the printing system shown in FIG. 1.

FIG. 9 is a flowchart illustrating an example of operation performed by the printing system 1 shown in FIG. 1. The flowchart in FIG. 9 is described by adding a step number including the character "S" and a numerical value to each of steps in the operation of the printing system 1, particularly, a part of operation related to the print controller 2.

1. Reception of Print Job

First, in step S1, the reception unit 200 receives a print job transmitted from the terminal apparatus 4 in response to an operation performed by a user. The reception unit 200 also records the print job in the job information 211 in the storage unit 21. The print job may be generated by operating an operable unit (not shown) of the printer 3.

In a case where the additional printing mode as a second printing condition contained in the print job is set to "on" (ON in step S2), the execution command unit 203 sets the output face to the "front face" and sets the set value for the "print-from-final-page" mode to "on" in step S3.

2. Execution of Background Printing

In step S4, the execution command unit 203 commands the printer 3 to execute background printing in accordance with the settings described above. The printer 3 executes background printing in accordance with the command given by the execution command unit 203.

FIGS. 6A to 6D illustrate an example where background printing is executed in the printer 3. In each of FIGS. 6A to 6D, the left column indicates an example of media 5A fed to the feed tray, and the right column indicates an example of media 5B output onto the output tray after printing is performed on the media 5A.

As shown in FIG. 6A, the printer 3 first performs M-to-1 printing in which background printing is performed on the media 5 sequentially from the final page image 500m toward the leading page image 500a. Moreover, the printer 3 outputs the media 5B having undergone the background printing to the output tray in a state where the front face of each medium 5B faces upward (i.e., upward in the drawings).

The media 5B having undergone the background printing are output in a sequence corresponding to the sequence in which the background printing is performed. Specifically, the media are output in a sequence starting from the M-th medium 5m having the final page image 500m background-printed thereon to the first medium 5a having the leading page image 500a background-printed thereon. In other words, as shown in the right column in FIG. 6A, the (M−1)-th medium, . . . , and the first medium 5a are sequentially stacked on the M-th medium 5m.

When the printing is completed, the printer 3 transmits, to the print controller 2, result information indicating that the printing is completed. When the reception unit 200 receives the result information, the display control unit 202 performs control in step S5 so as to cause the display unit 23 to display the sheet-feed confirmation dialog 6.

The above-described steps S4 and S5 related to background printing are repeatedly performed until a command for switching to color printing is given via the sheet-feed confirmation dialog 6 (NO in step S6).

If background printing is to be repeatedly performed, the execution command unit 203 switches the set value for the "print-from-final-page" mode from one of the currently-set "on" value and the "off" value to the other value every time background printing is to be performed. Specifically, in step S7, the execution command unit 203 inverts the set value for the "print-from-final-page" mode.

In detail, the execution command unit 203 switches the set value for the "print-from-final-page" mode to "off" if the current set value is "on", and switches the set value to "on" if the current set value is "off".

The user rearranges the media 5B output on the output tray of the printer 3 to the feed tray while maintaining the output state. The expression "while maintaining the output state" refers to a state where, for example, the vertical and horizontal arrangement directions of the media 5B, the directions of the front and rear faces thereof, and the sequence in which the media 5B are stacked are not changed.

Specifically, as shown in FIG. 6B, when second background printing is to be performed, the media 5B output after the first background printing are disposed on the feed tray (see the left column in FIG. 6B and an arrow) while the output state is maintained (see the right column in FIG. 6A).

In second background printing, the set value for the "print-from-final-page" mode is switched from the set value "on" in the first background printing to "off", as described above. Therefore, as shown in FIG. 6B, in second background printing, the printer 3 performs 1-to-M printing on the rearranged media 5A by sequentially performing background printing from the leading page image 500a toward the final page image 500m.

Furthermore, the printer 3 outputs the media 5B having undergone the second background printing to the output tray in a state where the front face of each medium 5B faces upward (see the right column in FIG. 6B).

The media 5B having undergone the second background printing are output in a sequence corresponding to the sequence in which the second background printing is performed. Specifically, the media 5B are output sequentially from the first medium 5a on which the first page image 500a is background-printed to the M-th medium 5m on which the final page image 500*m* is background-printed. In other words, as shown in the right column in FIG. 6B, the second medium, . . . , and the M-th media 5*m* are sequentially stacked on the first medium 5*a*.

Although a detailed description will be omitted, third background printing, fourth background printing, and so on are similarly performed, as shown in FIGS. 6C and 6D. It is clear from the above description that, since the print results obtained as a result of background printing are output facing upward onto the output tray, the user may visually confirm the condition of background printing. Then, the user may readily determine whether or not to end the background printing.

3. Execution of Color Printing

In a case where a command for switching to color printing is given via the sheet-feed confirmation dialog 6 (YES in step S6), the execution command unit 203 commands the printer 3 to execute color printing in accordance with the set value for the "print-from-final-page" mode in the previous printing (i.e., background printing).

Specifically, if the set value for the "print-from-final-page" mode in the previous printing (i.e., background printing) is "on" (ON in step S8), the execution command unit 203 switches the set value for the "output face" to the rear face in step S9.

The case where the set value for the "print-from-final-page" mode in the previous printing (i.e., background printing) is "on" corresponds to a case where the number of times background printing is to be performed (i.e., (N−1) times) is an odd number.

If the set value for the "print-from-final-page" mode in the previous printing (i.e., background printing) is "off" (OFF in step S8), the execution command unit 203 does not switch the set value for the "output face" and keeps the set value at the "front face".

The case where the set value for the "print-from-final-page" mode in the previous printing (i.e., background printing) is "off" corresponds to a case where the number of times background printing is to be performed (i.e., (N−1) times) is an even number.

Subsequently, in step S10, the execution command unit 203 inverts the set value for the "print-from-final-page" mode. Specifically, the execution command unit 203 switches the set value for the "print-from-final-page" mode from "on" to "off" or from "off" to "on".

Then, in step S11, the execution command unit 203 commands the printer 3 to execute color printing in accordance with the settings described above. The printer 3 executes printing in accordance with the command given by the execution command unit 203.

i. If Set Value for "Print-from-Final-Page" Mode in Previous Background Printing is "On"

Figure 7:
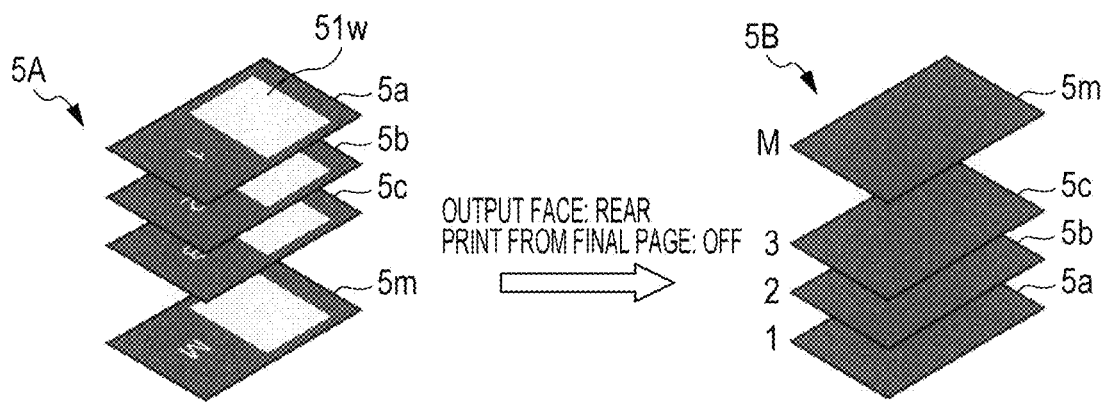
FIG. 7 illustrates an example of color printing in a case where a set value for the output face is the rear face.

FIG. 7 illustrates an example of color printing in a case where the set value for the "output face" is the rear face. If the set value for the "print-from-final-page" mode in the previous background printing is "on" (ON in step S8), the output media 5B are arranged in the following sequence from the bottom: M-th medium, (M−1)-th medium, . . . , and first medium (see FIG. 6A or 6C). In this case, as shown in the left column in FIG. 7, the media 5A are rearranged on the feed tray in the following sequence from the bottom: M-th medium, (M−1)-th medium, . . . , and first medium.

Furthermore, the printer 3 executes printing in accordance with the set value after the switching. Specifically, the printer 3 executes color printing under conditions in which the set value for the "print-from-final-page" mode is "off" and the set value for the "output face" is the rear face.

Specifically, color printing (i.e., "1-to-M printing") is performed on the media 5A arranged in the state shown in the left column in FIG. 7, sequentially from the leading page image 500*a* toward the final page image 500*m*.

Furthermore, the printer 3 outputs the media 5B having undergone the color printing onto the output tray in a state where the rear face of each medium 5B faces upward (i.e., upward in the drawings). As a result, as shown in the right column in FIG. 7, the second medium 5*b*, . . . , and the M-th medium 5*m* are sequentially stacked on the first medium 5*a* with the rear faces thereof facing upward (i.e., the front faces thereof facing downward).

Accordingly, the media 5B are output with the printed faces thereof facing downward (i.e., downward in the right column in FIG. 7), sequentially from the leading page to the final page from the bottom toward the top.

ii. If Set Value for "Print-from-Final-Page" Mode in Previous Background Printing is "Off"

Figure 8:
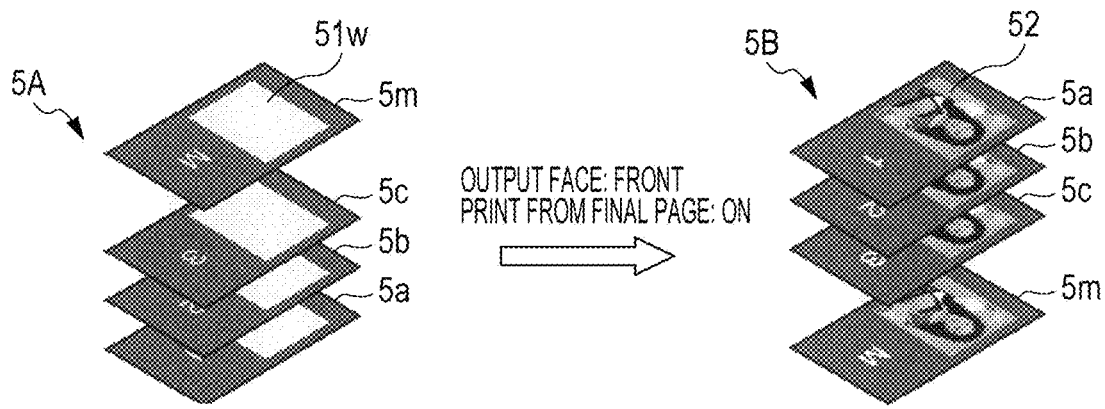
FIG. 8 illustrates an example of color printing in a case where the set value for the output face is the front face.

FIG. 8 illustrates an example of color printing in a case where the set value for the "output face" is the "front face". If the set value for the "print-from-final-page" mode in the previous background printing is "off" (OFF in step S8), the output media 5B are arranged in the following sequence from the bottom: first medium, second medium, . . . , and M-th medium (see FIG. 6B or 6D). In this case, as shown in the left column in FIG. 8, the media 5A are rearranged on the feed tray in the following sequence from the bottom: first medium, second medium, . . . , and M-th medium.

Furthermore, the printer 3 executes color printing under conditions in which the set value for the "print-from-final-page" mode is "on" and the set value for the "output face" is the front face.

Specifically, color printing (i.e., "M-to-1 printing") is performed on the media 5A arranged in the state shown in the left column in FIG. 8, sequentially from the final page image 500*m* toward the leading page image 500*a*.

Furthermore, the printer 3 outputs the media 5B having undergone the color printing onto the output tray in a state where the front face of each medium 5B faces upward (i.e., upward in the drawings). As a result, as shown in the right column in FIG. 8, the (M−1)-th medium 5(*m*−1), . . . , and the first medium 5*a* are sequentially stacked on the M-th medium 5*m* with the front faces thereof facing upward.

Accordingly, the media 5B are output with the printed faces thereof facing upward (i.e., upward in the right column in FIG. 7), sequentially from the leading page to the final page from the top toward the bottom.

4. If Additional Printing is not to be Performed

If the additional printing mode is set to an "off" mode (OFF in step S2), additional printing is not performed. In this case, the execution command unit 203 commands the printer 3 to perform normal printing in step S12. The term "normal printing" refers to printing performed using a white recording material and CMYK recording materials in single operation.

First Modification

In the above exemplary embodiment, the sheet-feed confirmation dialog 6 is displayed in step S5, and the user is inquired about whether or not the printing mode is to be switched from background printing to color printing every time background printing is to be performed, without preliminarily setting the number of times additional printing is to be performed. Alternatively, the number of times additional printing is to be performed may be set in advance. The method of preliminarily setting the number of times additional printing is to be performed may be particularly effective in a case where, for example, information about how much background printing is to be performed is obtained in advance.

The number of times additional printing is to be performed may be set in advance by the user. Numerical information indicating the number of times additional printing is to be performed may be contained in, for example, the print job. The reception unit 200 that stores the number of times additional printing is to be performed into the storage unit 21 is an example of a first setting unit.

Furthermore, in addition to the additional printing mode and the numerical information mentioned above, the second printing condition may include a designation of the final output state (may simply be referred to as "final state" hereinafter) of each medium 5 having undergone background printing and color printing. Specifically, the "output face" related to the final state and the set value for the "print-from-final-page" mode may be set in advance by the user. The reception unit 200 that stores these designation values in the storage unit 21 is an example of a second setting unit.

The execution command unit 203 sets the set value for the "print-from-final-page" mode related to first background printing and the set value for the "output face" related to N-th color printing in accordance with the designated number of times additional printing is to be performed, the "output face" related to the final state, and the set value for the "print-from-final-page" mode.

Depending on the configuration of a recording unit of the printer 3, the printer 3 may be capable of performing background printing and color printing simultaneously (in a single process). In the following description, it is assumed that final background printing is performable simultaneously with color printing.

For example, when the number of times additional printing is to be performed is set to an odd number, the set value for the "output face" related to the final state is set to the "front face", and the set value for the "print-from-final-page" mode is set to "on", the execution command unit 203 sets the set value for the first "print-from-final-page" mode to "on" and sets the set value for the "output face" related to N-th color printing to the "front face".

Figure 10:
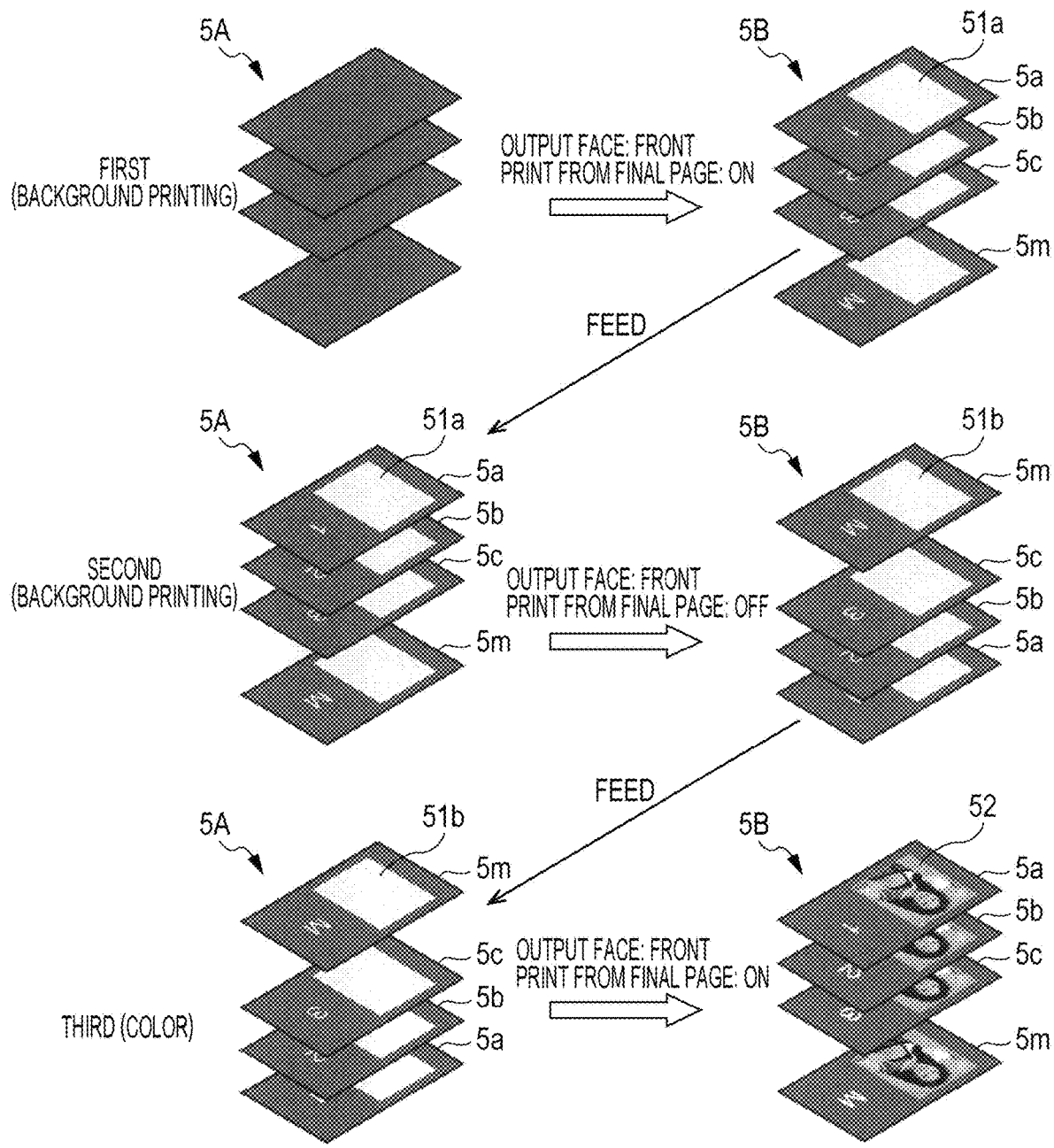
FIG. 10 illustrates an example of additional printing according to a modification.

FIG. 10 illustrates an example of additional printing according to a modification. In FIG. 10, the number of times additional printing is to be performed is set to, for example, "3" as an odd number. As shown in FIG. 10, in order to output the media 5B with the front faces thereof facing upward as the final state in the following sequence from the bottom: M-th medium, (M−1)-th medium, . . . , and first medium, printing is performed by setting the set value for the "print-from-final-page" mode in first background printing to "on".

Furthermore, every time background printing is to be performed, the set value for the "print-from-final-page" mode is switched between "on" and "off". The final third background printing and color printing are performed with the set value for the "output face" maintained at the designated "front face".

Furthermore, as another example, when the number of times additional printing is to be performed is set to an odd number, the set value for the "output face" related to the final state is set to the "rear face", and the set value for the "print-from-final-page" mode is set to "on", the execution command unit 203 sets the set value for the first "print-from-final-page" mode to "on" and changes the set value for the "output face" related to N-th color printing to the "rear face".

Figure 11:
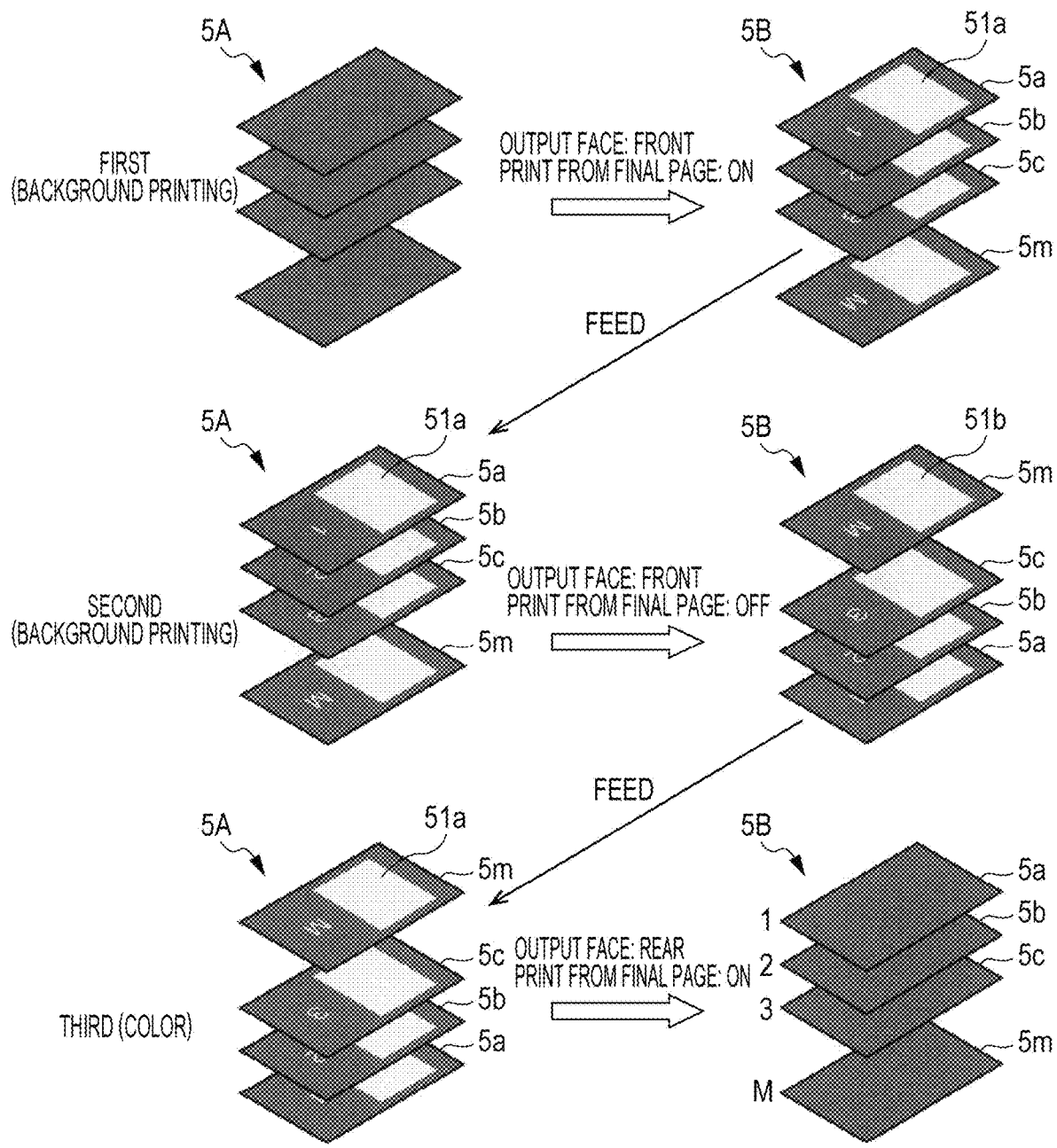
FIG. 11 illustrates an example of additional printing according to another modification.

FIG. 11 illustrates an example of additional printing according to another modification. In FIG. 11, the number of times additional printing is to be performed is set to, for example, "3" as an odd number, similarly to FIG. 10. As shown in FIG. 11, in order to output the media 5B with the rear faces thereof facing upward as the final state in the following sequence from the bottom: M-th medium, (M−1)-th medium, . . . , and first medium, printing is performed by setting the set value for the "print-from-final-page" mode in first background printing to "on".

Furthermore, every time background printing is to be performed, the set value for the "print-from-final-page" mode is switched between "on" and "off". The final third background printing and color printing are performed with the set value for the "output face" maintained at the designated "rear face".

Furthermore, although not shown in particular, printing under other conditions is also possible, as in FIGS. 10 and 11. Table 1 shown below indicates combinations of the designated final state, the designated number of times additional printing is to be performed, and the set value for the "print-from-final-page" mode related to first background printing and the set value for the "output face" related to color printing set by the execution command unit 203 in accordance with the above designations.

TABLE 1

| No. | Number of Times Additional Printing is to be Performed | Designations by User | | Execution Command Unit 203 | | Reference Drawing |
|---|---|---|---|---|---|---|
| | | Final State | | 1-st | N-th | |
| | | Output Face | Print from Final Page | Print from Final Page | Print Face | |
| 1 | Odd | Front | ON | ON | Front | FIG. 10 |
| 2 | Odd | Rear | ON | ON | Rear | FIG. 11 |
| 3 | Odd | Front | OFF | OFF | Front | Not Shown |
| 4 | Odd | Rear | OFF | OFF | Rear | Not Shown |
| 5 | Even | Front | ON | OFF | Front | Not Shown |
| 6 | Even | Rear | ON | OFF | Rear | Not Shown |
| 7 | Even | Front | OFF | ON | Front | Not Shown |
| 8 | Even | Rear | OFF | ON | Rear | Not Shown |

Second Modification

Although the above exemplary embodiment relates to an example where additional printing is performed only on one face of each medium 5, the additional printing may be performed on both faces of each medium 5.

If additional printing is to be performed on both faces of each medium 5, the execution command unit 203 uniformly sets the set value for the "output face" to the "rear face", regardless of the number of times the additional printing is to be performed. Moreover, if the number of pages in the document 500 is an odd number, the execution command unit 203 gives a command for executing printing by adding a blank page subsequent to the final page. In other words, if the number of pages in the document 500 is an odd number, the execution command unit 203 gives a command for executing printing by adding one blank page to make the number of pages in the document 500 an even number. The execution command unit 203 is an example of an adding unit. The following detailed description relates to a case where the number of page images in the document 500 (i.e., the number of pages in the document 500) is an even number and a case where the number of pages images in the document 500 is an odd number.

1. If Number of Pages in Document 500 is Even Number

Figure 12:
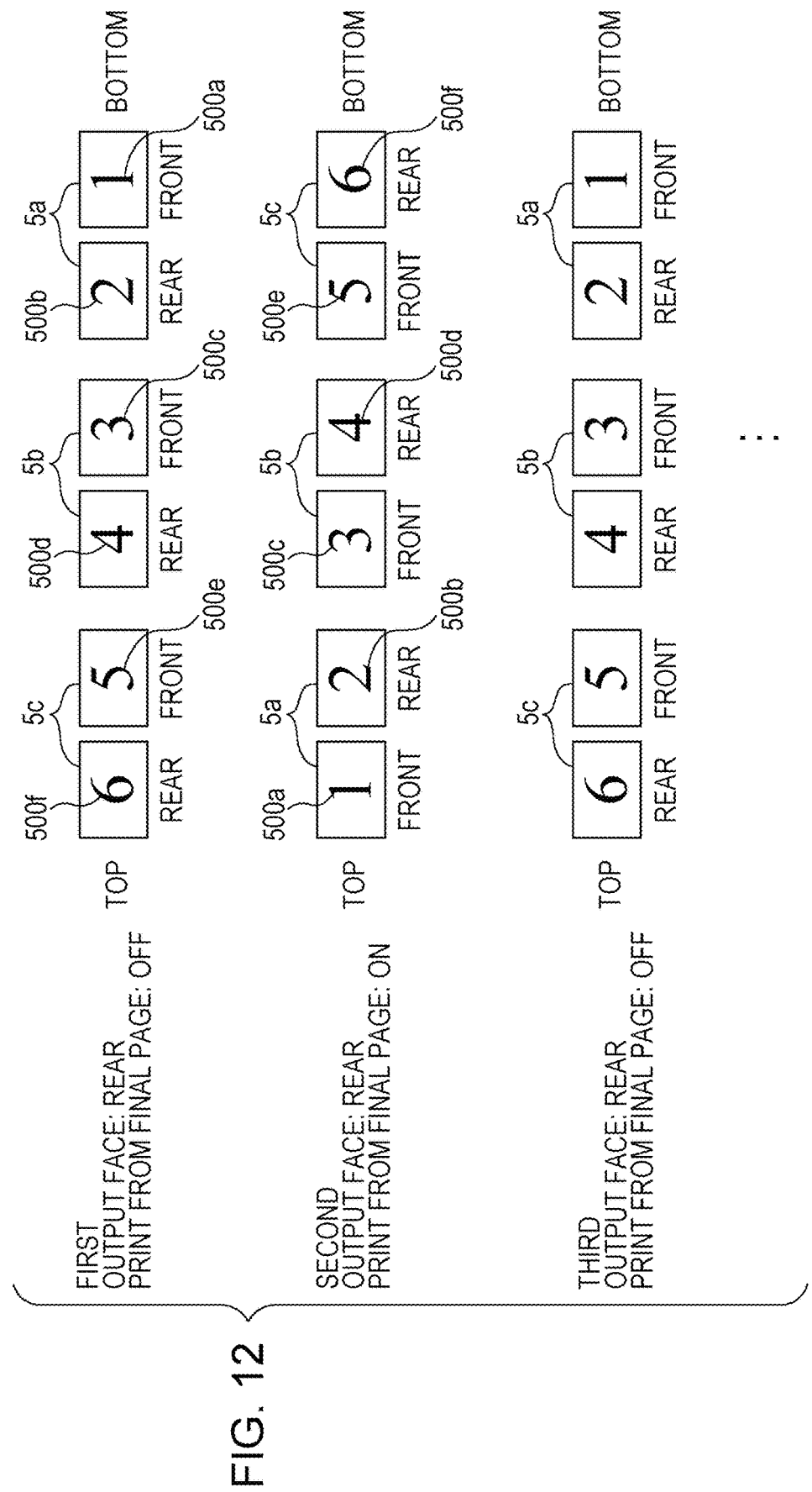
FIG. 12 schematically illustrates an example of duplex additional printing in a case where the number of pages in a document is an even number.

FIG. 12 schematically illustrates an example of duplex additional printing in a case where the number of pages in the document 500 is an even number. The following description relates to a case where the document 500 has six pages. FIG. 12 schematically illustrates first additional printing to N-th additional printing performed sequentially from the upper part toward the lower part of the drawing.

Each rectangle in FIG. 12 schematically indicates a medium 5B output after each additional printing process. The numerical values within the respective rectangles indicate page numbers of page images 500a to 500f printed on media 5B.

Two rectangles form one pair, and each pair of rectangles indicates a single medium 5B. Moreover, each of the rectangles forming each pair indicates one of the front face and the rear face of a single medium 5B. Text shown below each rectangle is information indicating which face the rectangle corresponds to.

The left rectangle of each pair corresponds to the upward-facing face when the medium is output, and the right rectangle of each pair corresponds to the upward-facing face when the medium is output. Although the term "front face" in duplex printing refers to, for example, the smaller one of the page numbers, this may be inverted.

As shown in FIG. 12, the "output face" is set to the "rear face" regardless of the number of times additional printing is to be performed. Furthermore, every time background printing is to be performed, the set value for the "print-from-final-page" mode is switched between "on" and "off". By performing additional printing in this manner, identical page images are repeatedly printed onto identical faces of identical media 5.

2. If Number of Pages in Document 500 is Odd Number

Figure 13:
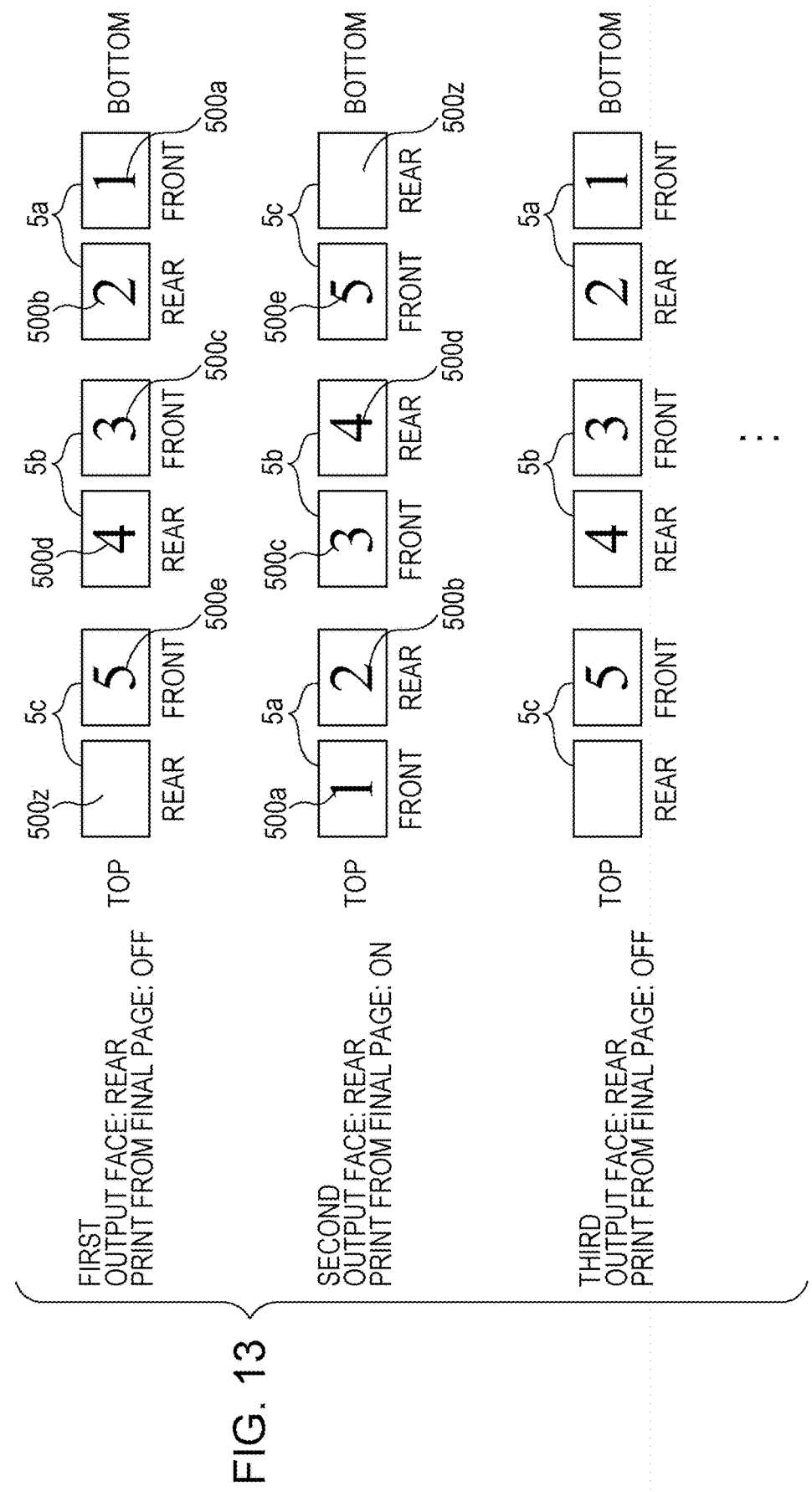
FIG. 13 schematically illustrates an example of duplex additional printing in a case where the number of pages in a document is an odd number.

FIG. 13 schematically illustrates an example of duplex additional printing in a case where the number of pages in the document 500 is an odd number. The following description relates to a case where the document 500 has five pages. The indications in FIG. 13 are identical to those shown in FIG. 12.

As shown in FIG. 13, the "output face" is set to the "rear face" regardless of the number of times additional printing is to be performed. Furthermore, every time background printing is to be performed, the set value for the "print-from-final-page" mode is switched between "on" and "off".

Moreover, printing is performed by making the number of page images an even number by adding a blank page image 500z subsequent to the final page image 500e.

Figure 14:
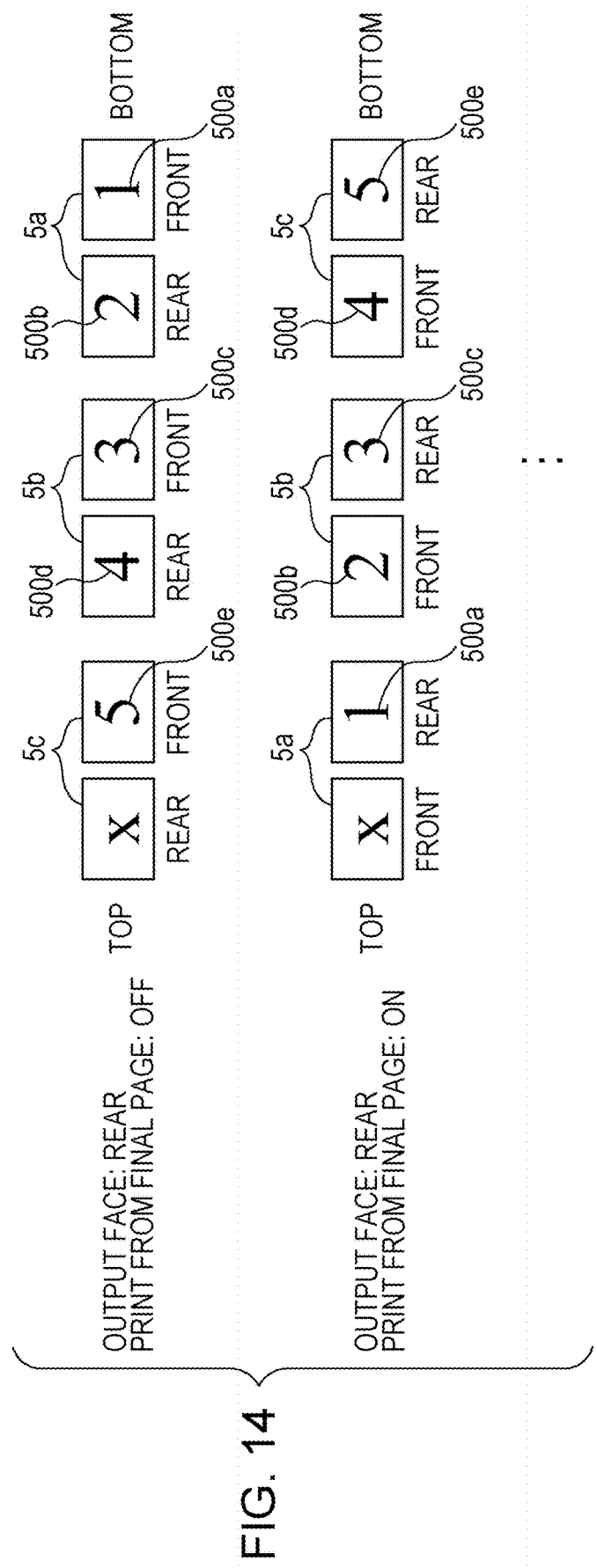
FIG. 14 illustrates an example where printing is performed without adding a blank page image.

FIG. 14 illustrates an example where printing is performed without adding the blank page image 500z. In FIG. 14, an "x" symbol indicates that there is no page image. As shown in FIG. 14, if printing is performed without adding a blank page, different page images are printed onto identical faces of identical media 5. In other words, a page shift occurs. By adding the blank page image 500z, as shown in FIG. 13, identical page images are printed onto identical faces of identical media 5, without causing a page shift to occur.

When duplex printing is to be performed, the set value for the first "print-from-final-page" mode may either be "off" or "on".

Although the exemplary embodiment of the present disclosure has been described above, an exemplary embodiment of the present disclosure is not limited to the above-described exemplary embodiment, and various modifications are permissible within the scope of the present disclosure. For example, the terminal apparatus 4 does not necessarily have to be provided. The functions of the terminal apparatus 4 may be provided in the printer 3 (such as a multifunction apparatus), and the above-described process may be executed in response to a user operation performed on an operation display unit (not shown) of the printer 3. Moreover, instead of separately providing the print controller 2 and the printer 3, the functions of the two may be integrated into a single apparatus.

Furthermore, as an alternative to the mode in which final background printing is performed in concert with color printing, for example, the color printing and the background printing may be performed separately. In this case, the number of times printing is to be performed is equal to the number of times additional printing is performed (i.e., the number of times background printing is to be performed) plus one.

Each of the units in the control unit 20 may partially or entirely be constituted of a hardware circuit, such as a field-programmable gate array (FPGA) or an application specific integrated circuit (ASIC).

The components in the above-described exemplary embodiment may partially be omitted or changed within the scope of the present disclosure. Furthermore, in the flowchart in the above-described exemplary embodiment, a step or steps may be added, deleted, changed, or interchanged within the scope of the present disclosure. Moreover, the program used in the above-described exemplary embodiment may be provided by being recorded in a computer-readable recording medium, such as a compact-disc read-only memory (CD-ROM), or may be stored in an external server, such as a cloud server, and be used via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A print controller comprising:
   a central processing unit; and
   a memory,
   wherein the central processing unit designates a number of times a first printing is to be performed and performs the first printing to print a plurality of page images onto first faces of a plurality of printing media in a first sequence at least two times according to the designated number of times, in which the plurality of page images are printed starting from a leading page image toward a final page image, wherein the plurality of page images are printed in correspondence with the plurality of printing media by using a specific color set in advance in accordance with a base color of the plurality of printing media in the first printing, wherein the plurality of printing media are papers and the specific color is a white color or a metallic color;

wherein the central processing unit gives a command for outputting the plurality of printing media to an output destination of a printing apparatus in a state where a printed face of each printing medium faces upward; and wherein the central processing unit performs a second printing to re-print the plurality of page images onto the first faces of the plurality of printing media and designates whether the plurality of printing media that have undergone the second printing are to be output with front faces facing upward or rear faces facing upward according to the designated number of times, the plurality of printing media are fed to a feed destination of the printing apparatus while being kept in an upward-facing output state in the output destination in a second sequence, in which the plurality of page images are printed starting from the final page image toward the leading page image, wherein the plurality of page images are printed by using a plurality of colors according to the plurality of page images in the second printing.

2. The print controller according to claim 1, wherein the central processing unit switches the first printing to the second printing.

3. The print controller according to claim 2, wherein the central processing unit performs control to display the switch checkbox.

4. The print controller according to claim 1, wherein the central processing unit selects whether the first printing for a first time is to be performed in the first sequence or the second sequence in accordance with the number of times the first printing is to be performed and a direction of output faces of the plurality of printing media that have undergone the second printing.

5. The print controller according to claim 1, wherein the central processing unit further gives a command for outputting the printing media, which have undergone the second printing, in a state where a non-printed face of each printing medium faces upward.

6. The print controller according to claim 1, wherein in a case where the plurality of page images are to be printed in correspondence with opposite faces of the plurality of printing media, the central processing unit gives a command for outputting the plurality of printing media, which have undergone printing, in a state where front faces and rear faces of the plurality of printing media are inverted.

7. The print controller according to claim 6, wherein the central processing unit adds a blank page image to a predetermined position in the plurality of page images if the number of the plurality of page images is an odd number.

8. The print controller according to claim 7, wherein the central processing unit inserts the blank page image subsequent to the final page image in a case where the central processing unit gives a command for performing printing in the first sequence, and adds the blank page image previous to the leading page image in a case where the central processing unit gives a command for performing printing in the second sequence.

9. The print controller according to claim 1, wherein the central processing unit prints a plurality of other page images onto first faces of a plurality of other printing media in the second sequence, gives a command for outputting the plurality of other printing media to the output destination of the printing apparatus in a state where the printed face of each other printing medium faces upward, and re-prints the plurality of other page images onto the first faces of the plurality of other printing media, which are fed to the feed destination of the printing apparatus while being kept in the upward-facing output state in the output destination, in the first sequence.

10. A non-transitory computer readable medium storing a program causing a computer to execute a process, the process comprising:

designating a number of times a first printing is to be performed and performing a first printing to print a plurality of page images onto first faces of a plurality of printing media in a first sequence at least two times according to the designated number of times, in which the plurality of page images are printed starting from a leading page image toward a final page image, wherein the plurality of page images are printed in correspondence with the plurality of printing media by using a specific color set in advance in accordance with a base color of the plurality of printing media in the first printing, wherein the plurality of printing media are papers and the specific color is a white color or a metallic color;

giving a command for outputting the plurality of printing media to an output destination of a printing apparatus in a state where a printed face of each printing medium faces upward; and giving a command for performing a second printing to re-print the plurality of page images onto the first faces of the plurality of printing media and designating whether the plurality of printing media that have undergone the second printing are to be output with front faces facing upward or rear faces facing upward according to the designated number of times, wherein the plurality of printing media are fed to a feed destination of the printing apparatus while being kept in an upward-facing output state in the output destination in a second sequence, in which the plurality of page images are printed starting from the final page image toward the leading page image, wherein the plurality of page images are printed by using a plurality of colors according to the plurality of page images in the second printing.

11. A print controller comprising:

first print command means for designating a number of times a first printing is to be performed and performing a first printing to print a plurality of page images onto first faces of a plurality of printing media in a first sequence at least two times according to the designated number of times, in which the plurality of page images are printed starting from a leading page image toward a final page image, wherein the plurality of page images are printed in correspondence with the plurality of printing media by using a specific color set in advance in accordance with a base color of the plurality of printing media in the first printing, wherein the plurality of printing media are papers and the specific color is a white color or a metallic color;

output command means for giving a command for outputting the plurality of printing media to an output destination of a printing apparatus in a state where a printed face of each printing medium faces upward; and second print command means for giving a command for performing a second printing to re-print the plurality of page images onto the first faces of the plurality of printing media and designating whether the plurality of printing media that have undergone the second printing are to be output with front faces facing upward or rear faces facing upward according to the designated number of times, wherein the plurality of printing media are fed to a feed destination of the printing apparatus while being kept in an upward-facing output state in the output destination in a second sequence, in which the plurality of page images are printed starting from the final page image toward the leading page image, wherein the plurality of page images are printed by using a plurality of colors according to the plurality of page images in the second printing.

* * * * *